W. T. GAMAGE.
MACHINE FOR CUTTING FISH.
APPLICATION FILED AUG. 4, 1914.
1,316,026.
Patented Sept. 16, 1919.
2 SHEETS—SHEET 1.
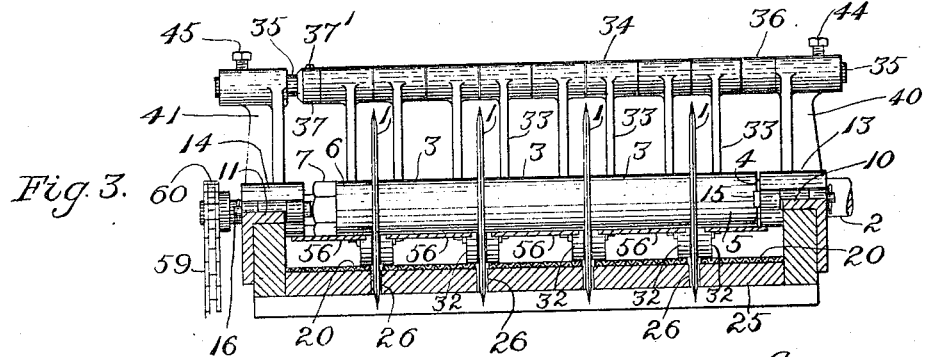
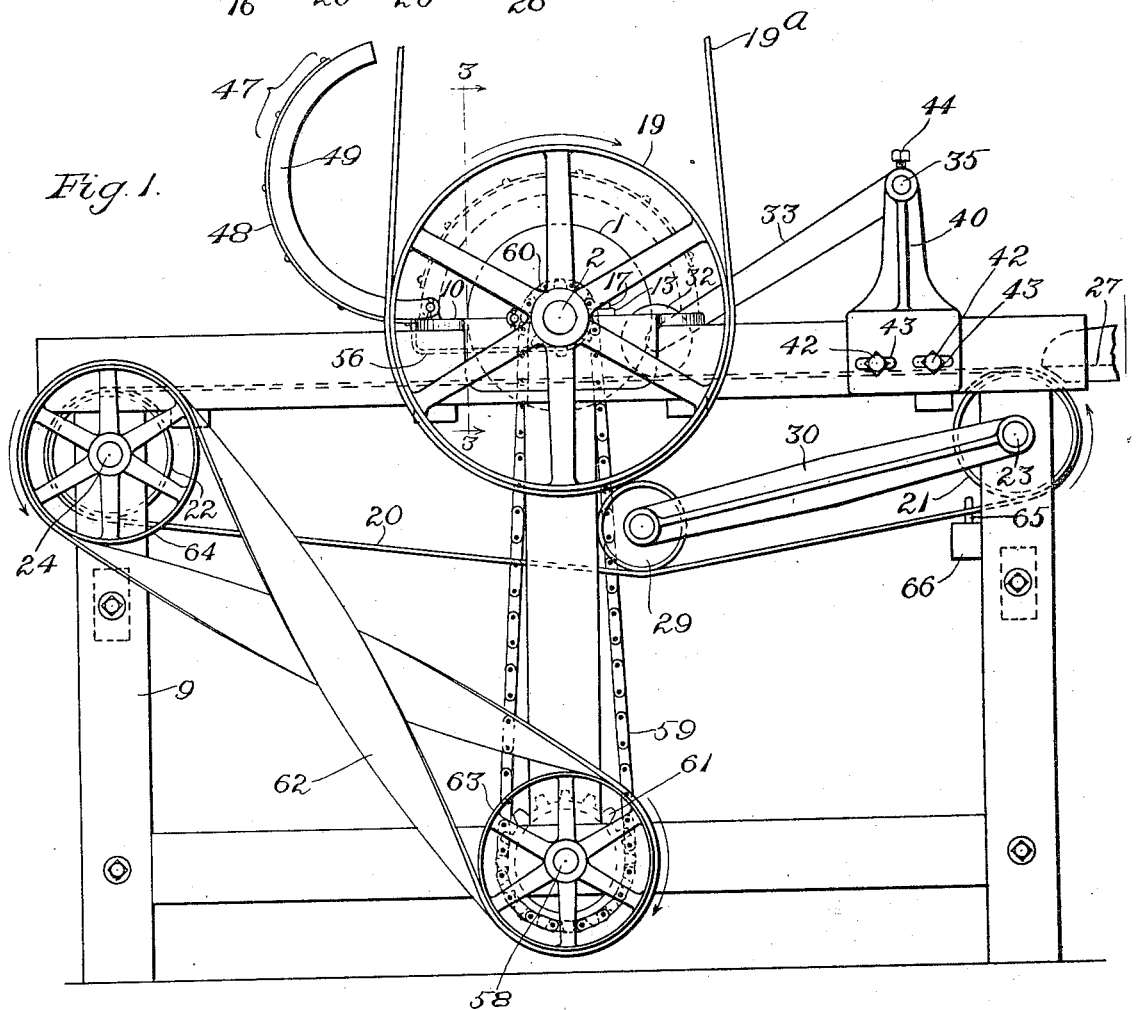
Witnesses:
Oscar F. Hill
Mamie B. Landers
Inventor:
William T. Gamage
by Chas. F. Randall
Attorney.

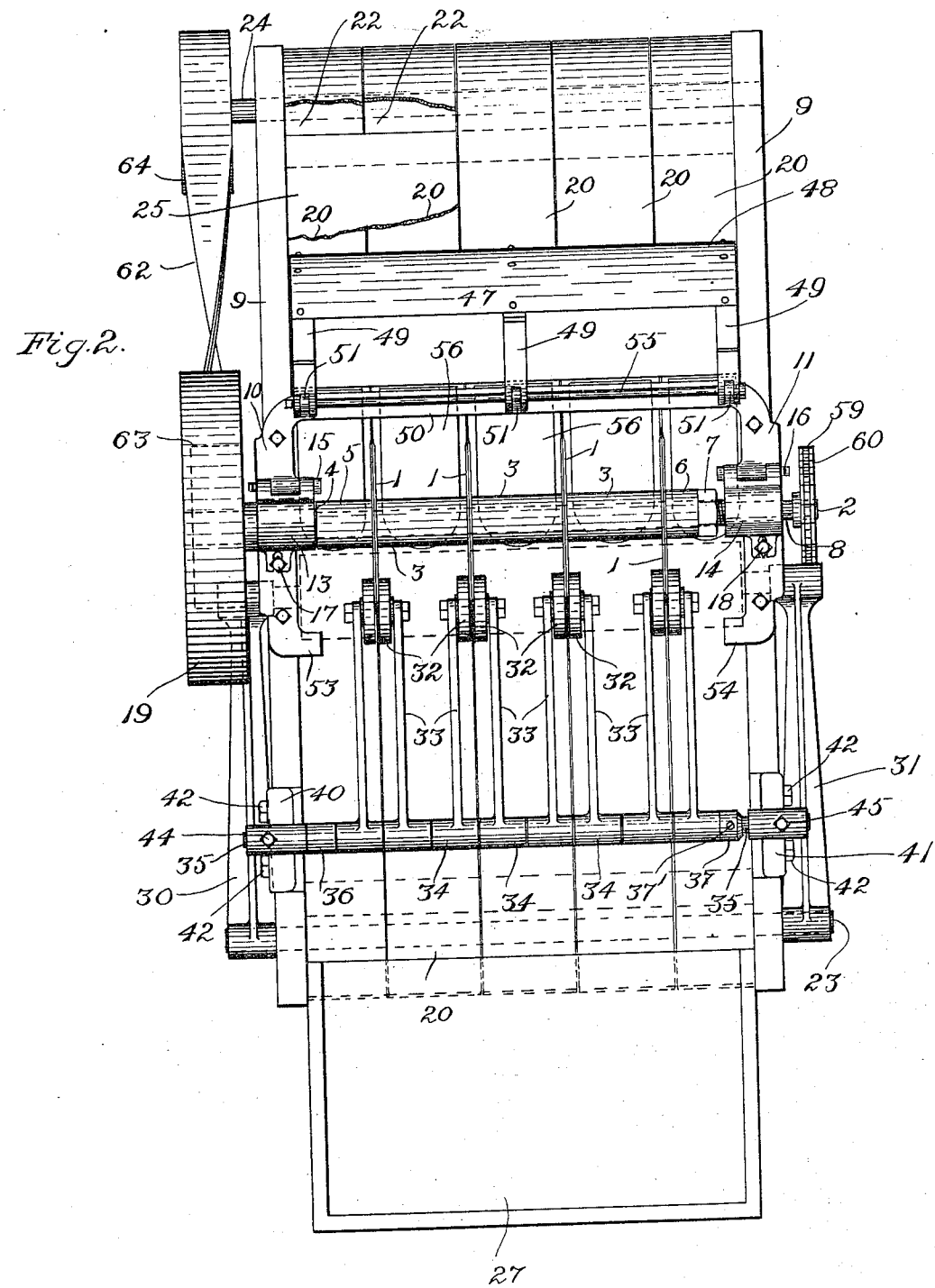

UNITED STATES PATENT OFFICE.

WILLIAM T. GAMAGE, OF GLOUCESTER, MASSACHUSETTS.

MACHINE FOR CUTTING FISH.

1,316,026.  Specification of Letters Patent.   Patented Sept. 16, 1919.

Application filed August 4, 1914. Serial No. 855,048.

*To all whom it may concern:*

Be it known that I, WILLIAM T. GAMAGE, a citizen of the United States, residing at Gloucester, in the county of Essex, State of Massachusetts, have invented a certain new and useful Improvement in Machines for Cutting Fish, of which the following is a specification, reference being had therein to the accompanying drawings.

The invention comprises improvements designed more especially for employment in machines for cutting fish into pieces of predetermined length. While the said improvements primarily are intended to be applied in machines employed in cutting up cured fish into short sections or lengths in preparation for packing, they also are useful in machines for cutting fresh or uncured fish into similar sections or lengths in preparation for canning or other processes, and in machines for doing other analogous work.

The invention aims generally to provide a simplified and improved machine, and more specifically to provide improved means for feeding the fish to and past the cutters and holding it during the cutting operation and as it passes and leaves the cutters.

The nature and object of the invention will more fully appear from the following specification and accompanying drawings, and the novel features will particularly pointed out in the claims.

Referring to the drawings in which I have illustrated a selected embodiment of my invention,—

Figure 1 is a view in side elevation of a machine constructed in accordance with my invention.

Fig. 2 is a plan view of the same, with portions of two of the conveyer-belts partly broken out at the rear of the cutters.

Fig. 3 is a view in section in the plane of the dotted line 3, 3, Fig. 1, looking in the direction indicated by the arrows.

The machine illustrated comprises, essentially, a series of parallel cutters, conveyer means by which the fish or piece of fish to be cut into shorter lengths or sections is carried to and past the cutters, and presser means coöperating with the conveyer means to insure proper feeding of the fish to and past the cutters, and in holding the fish in place while being cut.

The cutters in this instance, and preferably, are in the form of rotatable disks 1, 1, having sharp cutting edges and are supported in working position by being mounted upon a shaft 2, upon which they are spaced apart transversely of the machine according to the length or lengths of the sections into which the fish or piece of fish is to be divided. For convenience of construction, and to facilitate assembling and disassembling, the cutter-disks are fitted upon the said shaft with spacing-sleeves 3, 3, therebetween to hold them in proper spaced relation, the shaft 2 being shouldered near one end as indicated at 4, with collar 5 positioned against the shoulder, and the cutters and spacing-sleeves being clamped between the collar 5 and a collar 6 near the opposite end of the shaft by means of a nut 7 threaded on to such end and engaging with collar 6. This end of the shaft beyond the threaded portion is reduced as indicated at 8 to provide a smooth bearing portion or journal. The shaft is suitably mounted upon the main frame 9 of the machine, as by means of bearings provided in connection with brackets 10, 11, bolted to the frame at opposite sides of the machine. These bearings preferably are split, the upper portions or bearing-caps 13, 14, being removable to permit the shaft with the cutters to be lifted from the bearings for cleaning the machine or for sharpening the blades. In the construction illustrated the bearing-caps 13, 14, are pivoted to the brackets by pivot-pins 15, 16, and are held in closed position by screw-bolts 17, 18, extending through slots in the bearing-caps as clearly shown in Fig. 2.

A driving-pulley 19 is secured to one end of the shaft 2 with its hub in position to engage the adjacent bearing. Longitudinal movement of the shaft 2 is prevented by the engagement of the pulley-hub and the collar 5 with opposite sides of the said bearing, which is located between them.

The conveyer means consists, as illustrated, of a series of parallel conveyer-belts 20, 20, running upon pulleys 21, 22 mounted upon shafts 23, 24, rotatable in bearings provided on the main frame of the machine. The lower portions of the cutter-disks work between the proximate edges of these conveyer-belts. This series of parallel conveyer-belts constitutes a sectional endless conveyer. The fish laid upon the upper runs of the said conveyer-belts at the feeding end of the machine is carried by the same to the cutters, and the cut pieces are carried away from the cutters in a manner enabling them to be conveniently removed by an operator, or if preferred the said pieces may be discharged into a convenient receptacle or transferred to an auxiliary conveyer for transportation to any desired point. It will be noted that the construction is such that these belts may be made of canvas or similar material, and may be easily cleaned when desired.

The frame 9 is provided with a table 25 upon which the upper runs of the conveyer-belts travel, and by which the weight of the said runs and the material carried thereby is supported. Slots 26 are provided in this table to receive the portions of the cutters which project down below the belts. These slots are made no wider than is necessary to accommodate such portions of the cutters and their edges are fitted as snugly as is practicable to the sides of the cutter-disks, thus operating to keep the cutters clean and also providing support for the flexible belts as close to the sides of the cutters as possible. A supply table 27 is shown at the feeding end of the machine, conveniently located and designed to receive the fish previous to its being placed upon the conveyer-belts.

The belts preferably are of such width that their adjacent edges are close together, without however being actually in contact with one another, at the front of the cutter-disks and at the rear of the latter. The said edges may make close contact with the opposite sides of the cutter-disks, but injury to the edges of the belts by cutting, as in case of lateral swaying of the belts, is avoided by providing for a small interval between adjacent edges enabling them to clear the sides of the cutters slightly. The belts present a substantially continuous conveying surface in front and at the rear of the cutters, and provide support for the fish close alongside the cutting edges, so that they prevent portions of the fish being carried down by the cutters through the slots 26 in the table. Thereby jamming of pieces of fish in the said slots and clogging of the cutter-disks is prevented.

Means preferably is provided to take up automatically the slack of the conveyer-belts and insure a proper tension thereof. In the construction illustrated a single idler or tightening cylinder 29 rests upon and engages the lower runs of all of the conveyer-belts. This cylinder is retained in its working position by links 30, 31, pivoted to the free ends of the shaft 23. The weight of the said cylinder, aided by added weights or by springs if found necessary, is so proportioned that the desired tension will be obtained.

The presser means operates to press the fish against the conveyer means, and in the preferred form is so constructed that it accomplishes two objects. It holds the fish against the conveyer means with sufficient pressure to insure feeding movement, and it coöperates with the conveyer means to clamp the fish immediately at the places where the cuts are being made by the cutters, to prevent deflection of portions of the material during the cutting operation. In the illustrated construction the presser means comprises presser devices 32, 32, so constructed and so arranged and combined with each of the cutters, as to bear upon the fish upon opposite sides of the cutter, immediately adjoining the latter. The construction may vary more or less in practice, although preferably there are two presser devices between each two adjacent cutters, each yieldable toward and from the conveyer means independently of the other. The presser devices upon opposite sides of each cutter also preferably are yieldable independently of each other. The best results in the cutting operation are obtained if the presser devices are positioned close to the cutting edges of the respective cutters, at both sides of each of the latter, and this arrangement obtains in the construction illustrated. The presser devices 32, 32, of the said illustrated construction are shown in the form of rolls or disks, which are sufficiently weighted to provide the desired pressure, but it will be obvious that spring-tension may be utilized, if desired, to hold the rolls or disks down. The rolls or disks are suitably mounted for vertical movement, as by being connected to pivoted arms 33, 33. In the drawings the arms 33 are each provided with an extended hub 34, the series of hubs being mounted upon a supporting-rod 35 extending transversely of the frame and mounted in brackets 40, 41. The contact of the ends of the extended hubs with one another prevents lateral movement of the arms and rolls, or disks, but each of the rolls or disks is independently movable in a vertical plane to accommodate itself to irregularities in the thickness and surface of the fish passing under it. Collars 36, 37, upon the rod 35 at the ends of the series of hubs hold the arms in position upon the said rod. The collar 36 may be placed directly against the adjacent supporting bracket 40, for the supporting-rod, but the other collar, 37, is preferably fixed upon the supporting-rod as by means of a clamping screw 37'. The brackets 40, 41, are secured to the frame by convenient means, as by screw-bolts 42, 42, extending through slots 43, 43, in the flanges of such brackets into the frame. To provide for adjustment of the rolls so as to enable them to be located properly with respect to the points at which the edges of the cutter-disks cut into the fish, the said slots 43, 43, are elongated horizontally, which permits the brackets to be shifted rearward or forward in the machine until the rolls or disks are located as required. Clamping-screws 44, 45, hold the shaft 35 in position in the brackets.

A cover or guard 47 preferably is provided to protect the cutters and to avoid danger to the operator. In Fig. 1 the cover is shown in open position in full lines, the closed position being indicated in dotted lines. As illustrated, this cover is substantially semicylindrical in shape and consists of a curved plate 48 secured to parallel curved ribs 49. The rear portions of the brackets 10, 11, are connected with each other by a cross-bar 50, which is provided with lugs 51, 51, to provide support for the ribs 49, 49, and these brackets are provided at their front ends with inwardly-extending projections 53, 54, upon which the free ends of the outer ribs rest when the cover is in closed position. One long pivot pin 55 serves to pivotally connect all the ribs to the supporting lugs 51, 51.

Hold-down guards or strippers preferably are provided to prevent the cut material being lifted by the rapidly rotating cutters in the rear of the shaft 2. These are illustrated at 56, 56, and conveniently may consist of metal plates secured by their rear ends to the cross-bar 50, projecting downward therefrom and then forward between the cutters, and bent upwardly at their forward ends partly around the spacing-sleeves to facilitate the entrance of the pieces of fish between such ends and the conveyer-belts.

Driving mechanism may be arranged in any suitable manner. In the construction illustrated the pulley 19 is driven by means of a band 19ª, Fig. 1, from a pulley on an overhead shaft (not shown), thus rotating the shaft 2 and the cutters 1. A countershaft 58 mounted in the lower part of the machine frame is driven from the shaft 2 by means of a chain 59 and sprocket-wheels 60, 61, secured to the respective shafts. The pulley 22 is rigidly secured to its shaft 24, and this shaft is driven from the countershaft by means of a cross-belt 62 and pulleys 63, 64, secured to the respective shafts, thus operating the conveyer-belts.

The machine described is particularly designed for use in cutting fish, but it will be obvious that the principles and features of my invention are applicable to machines for cutting meat and other materials of a similar nature.

The conveyer-belts are prevented from working sidewise by means of guide-pins 65 coöperating with the lower runs of such belts, the said guide-pins entering the spaces between adjacent edges of the belts. The guide-pins are applied to a cross-bar 66 which is supported in proper position by being attached to the machine frame.

I claim as my invention.

1. In a machine for cutting fish into short lengths, the combination with a plurality of parallel rotatable cutter-disks, and a plurality of traveling conveyer-belts movable between the cutters, of a pair of movably mounted rollers arranged upon opposite sides of each cutter closely adjacent its cutting edge and positioned to press the fish against the conveyer-belts.

2. In a machine for cutting fish into short lengths, the combination with a plurality of parallel rotatable cutters, and a conveyer means conveying the fish to said cutters, of presser means holding the fish against the conveyer means during the cutting operation, and comprising an independently yieldable presser device adjacent each cutter and close to the cut made thereby and hold-down guards between the cutters preventing the cut pieces being lifted by the rotating knives.

In testimony whereof I affix my signature in presence of two witnesses.

WILLIAM T. GAMAGE.

Witnesses:
J. WM. DARCY,
MARGARET CARROLL.